United States Patent
Liu et al.

(10) Patent No.: US 8,645,418 B2
(45) Date of Patent: Feb. 4, 2014

(54) METHOD AND APPARATUS FOR WORD QUALITY MINING AND EVALUATING

(75) Inventors: Huaijun Liu, Shenzhen (CN); Zhongbo Jiang, Shenzhen (CN); Gaolin Fang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 60 days.

(21) Appl. No.: 13/465,465

(22) Filed: May 7, 2012

(65) Prior Publication Data

US 2012/0221602 A1 Aug. 30, 2012

Related U.S. Application Data

(63) Continuation of application No. PCT/CN2010/074597, filed on Jul. 28, 2010.

(51) Int. Cl.
*G06F 17/30* (2006.01)
(52) U.S. Cl.
USPC ........... 707/776; 707/706; 707/713; 707/722; 707/736; 707/758; 707/759; 707/769; 707/770; 707/771; 707/772; 707/773; 707/774; 707/775; 707/779; 707/780; 707/781; 706/12
(58) Field of Classification Search
USPC ................ 707/706, 713, 722, 736, 758, 759, 707/769–776, 779, 780, 781, 707/999.003–999.006; 706/12
See application file for complete search history.

(56) References Cited

U.S. PATENT DOCUMENTS

| 6,473,753 | B1 | 10/2002 | Katariya et al. | |
|---|---|---|---|---|
| 2004/0083224 | A1 | 4/2004 | Yoshida | |
| 2009/0119281 | A1* | 5/2009 | Wang et al. | 707/5 |
| 2009/0287642 | A1* | 11/2009 | Poteet et al. | 707/3 |

FOREIGN PATENT DOCUMENTS

CN 101290626 A 10/2008

OTHER PUBLICATIONS

International Search Report and Written Opinion for corresponding international application No. PCT/CN2010/074597, mailing date Oct. 21, 2010.
International Preliminary Report on Patentability for corresponding international application No. PCT/CN2010/074597, dated May 15, 2012.
Office action from Russian Patent Application No. 2012123216 dated Aug. 26, 2013 (with English language reporting letter summarizing the same).

* cited by examiner

*Primary Examiner* — Syling Yen
(74) *Attorney, Agent, or Firm* — Marshall, Gerstein & Borun LLP (57) ABSTRACT

A method and an apparatus for word quality mining and evaluating are disclosed. The method includes: calculating a Document Frequency (DF) of a word in mass categorized data; evaluating the word in multiple single-aspects according to the DF of the word; and evaluating the word in multiple aspects according to the multiple single aspect evaluations to obtain an importance weight of the word. According to the solution of the present invention, the importance of the word in the mass categorized data may be evaluated, and words with high quality may be obtained through an integrated evaluation.

18 Claims, 2 Drawing Sheets

METHOD AND APPARATUS FOR WORD QUALITY MINING AND EVALUATING

CROSS-REFERENCE TO RELATED APPLICATIONS

This is a continuation of International Patent Application No. PCT/CN2010/074597 filed Jun. 28, 2010, which in turn claims the priority benefit of Chinese Patent Application No. CN 200910237185.7 filed Nov. 10, 2009, the entire respective disclosures of which are incorporated herein by reference.

FIELD OF THE INVENTION

The present invention relates to Internet information processing techniques, and more particularly, to a method and an apparatus for word quality mining and evaluating.

BACKGROUND OF THE INVENTION

With rapid development of the Internet, the problem of "information overload" becomes more and more serious. When people enjoy the convenience brought out by the Internet, they are also flooded with mass of information on the Internet. It is urgent to solve the problem of how to extract effective information from mass Internet data more effectively and accurately.

Currently, there are various kinds of Internet platforms. They provide large amount of data to users. Among them, there are familiar search engines, e.g. Google, Baidu, Soso; there are also interactive Q&A platforms, e.g. Zhidao, Wenwen, Answers; and also popular blog platforms, e.g. Qzone, Sina blog, etc.

All of these Internet platforms require a natural language text processing technique, i.e. extract effective information from mass data for processing. The natural language text processing is to analyze the syntax of a document, e.g. categorization, clustering, summarization, similarity analysis. Since each document is composed of words, each detailed technique in the natural language text processing necessitates comprehension of words. Therefore, how to accurately evaluate the importance of a word in a sentence becomes an important problem to be researched.

For example, as to a sentence "China has a long history, great wall and terracotta army are pride of China", wherein the words "China", "great wall", "terracotta army" and "history" are obviously more important than others.

The word quality mining and evaluating is to determine a proper quality level for a candidate word. For example, there may be three levels, i.e. important, common and constantly-used. Then, important words are selected. Afterwards, common words and constantly-used words are selected. Thus, when a document is analyzed, important words may be considered firstly, common words may be taken as supplementation, whereas constantly-used words may be filtered out completely.

Currently, a word quality mining and evaluating method based on mass data is usually implemented by calculating a Document Frequency (DF) and an Inverse Document Frequency (IDF) of a word. That is to say, a word which does not appear constantly, i.e. a low frequency word is regarded as an unimportant word. But, the importance of a word cannot be determined accurately based on the DF or the IDF calculated. For example, a calculated result based on a corpus is as follows: the IDF of a word "lighten" is 2.89, whereas the IDF of a word "ha ha" is 4.76. In addition, as to non-structured data, e.g. Q&A platform data and blog data, a low frequency word may be a mistaken word, e.g. a mistaken string "asfsdfsfda" input by a user, or "Gao Qi also" (segmented from a sentence "Gao QI also has hope to the new dynasty").

In addition, during document categorization, feature value methods such as Information Gain (IG) and $\chi^2$ are usually used to evaluate the contribution of a word to a category. However, only features whose values ranking in the first n will be selected as effective features, wherein n is an integer and may be selected according to a word quality mining and evaluating requirement. Then, a category weight is calculated based on TF-IDF, wherein TF denotes Term Frequency. The methods based on IG and $\chi^2$ are only used for selecting a feature word. They work well with respect to structured and little amount of data. But, with respect to mass unstructured data, a single aspect evaluation cannot reflect the importance of a word completely and cannot calculate the importance of the word effectively. For example, based on the same corpus, the $\chi^2$ of word "of" is 96292.63382, whereas the $\chi^2$ of "Jingzhou" is only 4445.62836. However, it is obvious that the word "Jingzhou" whose $\chi^2$ is lower is more important.

SUMMARY OF THE INVENTION

Embodiments of the present invention provide a method and an apparatus for word quality mining and evaluating, so as to determine the importance of a word accurately.

According to an embodiment of the present invention, a method for word quality mining and evaluating is provided. The method includes:

calculating a Document Frequency (DF) of a word in mass categorized data;

evaluating the word in multiple single-aspects according to the DF of the word; and evaluating the word in a multiple-aspect according to the evaluations in the multiple single-aspects to obtain an importance weight of the word.

According to another embodiment of the present invention, an apparatus for word quality mining and evaluating is provided. The apparatus includes:

a DF calculating unit, adapted to calculate a DF of a word in mass categorized data;

a single-aspect evaluating unit, adapted to evaluate the word in multiple single-aspects according to the DF of the word;

a multiple-aspect evaluating unit, adapted to evaluate the word in a multiple-aspect according to the multiple single-aspect evaluations to obtain an importance weight of the word.

Embodiments of the present invention provide an improved solution based on probability theory and entropy theory. The input is mass categorized data. The output is high quality words. According to the solution of the present invention, the importance of the word in the mass categorized data may be evaluated, and words with high quality may be obtained through an integrated evaluation.

The solution of the present invention may be applied to various scenarios of word quality mining and evaluation. For example, when being applied in search engine data, the solution of the present invention can extract high quality words accurately. The high quality words may be used for searching relativity sort and analyzing user searching string. For another example, when being applied in an interactive platform, blog platform or news, the solution of the present invention can extract a label word in the text accurately. Thus, accurate and high quality label words can be obtained for analyzing actions of the user, which facilitates user's customization and recommendation. In addition, when being applied in document categorization, clustering and summarization, the solution can realize accurate extraction of feature words to mine text information. The solution may also be applied in junk filtering and advertisement classification, so as to effectively extract keywords related to the category.

DETAILED DESCRIPTION OF THE INVENTION

In embodiments of the present invention, a DF of a word in mass categorized data is calculated, multiple single-aspect evaluations of the word are performed according to the DF, and a multiple-aspect evaluation of the word is performed according to the multiple single-aspect evaluations to obtain an importance weight of the word.

Figure 1:
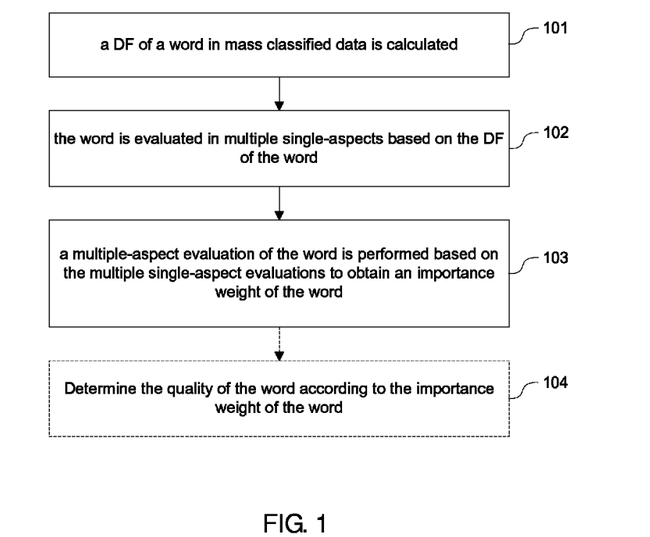
FIG. 1 is a flowchart illustrating a method for implementing word quality mining and evaluating according to an embodiment of the present invention.

FIG. 1 is a flowchart illustrating a method for implementing word quality mining and evaluating according to an embodiment of the present invention. As shown in FIG. 1, the method includes the following steps.

Step 101, a DF of a word in mass categorized data is calculated.

In the embodiment of the present invention, what is input is the mass categorized data. The mass categorized data refers to mass document data having been classified into different categories. For example, the mass categorized data may be news data classified by technique, sports, entertainment. For another example, the mass categorized data may also be data from an interactive Q&A platform classified by computer, education and games.

The calculation of the DF of the word is the first step for the quality mining and evaluating. The objective of the calculation is to obtain a statistic required in subsequent calculation. The calculation of the DF of the word in the mass categorized data mainly includes: calculate a DF vector of the word in each category of the mass categorized data and calculate a DF of the word in all the categories.

Before the DF of the word is calculated, words are obtained by segmenting the mass categorized data and some processing may be performed to the words in advance, e.g. unify traditional characters and simplified characters, unify capital characters and lower case characters, unify full-width and half-width characters, such that the words used for quality mining and evaluating may have a uniform format.

The DF vector of the word w in each category of the mass categorized data is calculated to obtain a vector $FW=\{df_1, df_2, \ldots, df_n\}$, wherein df denotes the DF vector of the word w in category i, $i=1, 2, \ldots, n$, n denotes the number of categories. For example, there are two categories: computer and sports, the DF vectors of the word "computer" in the two categories are respectively 1191437 and 48281. Then, the DF vector of the word "computer" is expressed as {1191437, 48281}.

The DF of the word w in all the categories is calculated. Specifically, the DF of the word w is a sum of the DF vectors of the word w in all the categories, i.e.

$$DF = \sum_i df_i, i = 1, 2, \ldots, n,$$

wherein n is the number of categories.

Step 102, the word is evaluated in multiple single-aspects based on the DF of the word.

After the DF of the word is calculated, multiple single-aspect evaluations of the word will be performed based on probability theory and entropy theory. In particular, following aspects may be considered.

Inverse Document Frequency (IDF)

IDF is to evaluate the quality of the word in all the categorized data based on the DF of the word. Specifically, it is expressed as $$IDF(w) = \log\frac{\text{total number of documents}}{DF + 1},$$

wherein DF denotes the DF of the word w in all the categorized data, i.e.

$$DF = \sum_i df_i.$$

Average Inverse Document Frequency (AVAIDF)

AVAIDF is an average of the IDF of the word in each category, expressed as $$AVAIDF(w) = \frac{\sum_i IDF_i}{n},$$

wherein $IDF_i(w) = \log\frac{\text{total number of documents}}{df_i + 1}$, $$i = 1, 2, \ldots, n,$$

$i=1, 2, \ldots, n$, n is the number of categories.

The problem of IDF and AVAIDF methods is as follows: with respect to high frequency words, the evaluation values, i.e. both the IDF(w) and the AVAIDF(w) are low; however, with respect to low frequency words, both evaluation values are high. Therefore, if the word quality mining is performed only based on the IDF and the AVAIDF, the evaluated result will be less accurate.

Chi-Square $\chi^2$

Chi-square $\chi^2$ is used for evaluating relativity between a word and a category, expressed as $$\chi^2(w) = \begin{cases} \sum \frac{(A-T)^2}{T}, & T \geq \theta \\ \sum \frac{(|A-T|-\lambda)^2}{T}, & 1 \leq T < \theta, 0 < \lambda < 1, \end{cases}$$

wherein A denotes an actual DF value of word w in a certain category, T denotes a theoretical DF value of the word w in the category, θ denotes a threshold of the theoretical DF value, and λ denotes a correction factor.

Combing step 101, $df_i$ is A. Therefore, the formula of chi-square $\chi^2$ is expressed as $$\chi^2(w) = \begin{cases} \sum_i \frac{(df_i-T)^2}{T}, & T \geq \theta \\ \sum_i \frac{(|df_i-T|-\lambda)^2}{T}, & 1 \leq T < \theta, 0 < \lambda < 1, \end{cases}$$

wherein i=1, 2, . . . , n, n denotes the number of categories.

The chi-square method has a following problem: the chi-square of a high frequency word and that of a low frequency word are not comparable since the numerator and denominator of each item $$\frac{(A-T)^2}{T}, \text{ i.e. } \frac{(df_i-T)^2}{T}$$

have different magnitudes. Thus, the chi-square of the high frequency word is usually high and the chi-square of the low frequency word is usually low. Therefore, the importance of the word cannot be determined by comparing chi-squares. In addition, as to a word with an extremely low frequency, the result of the chi-square method is less accurate.

Information Gain (IG)

IG is used for evaluating the amount of information provided by a word to a category.

A universal formula of IG includes two parts: an entropy of the whole category, and an expected value of an entropy of the distribution of each attribute of feature F, expressed as $$IG = \text{Entropy}(C) - \sum \frac{|F_i|}{|F|} \text{Entropy}(F_i).$$

When the importance of the word is evaluated, attributes of the feature F usually include {appear in the category, not appear in the category}. Thus, IG expresses a difference between the entropy of the whole category and the entropy of the whole category after considering the word.

When the IG method is adopted, the detailed expression is as follows $$IG(w) = -\sum_i P(c_i)\log P(c_i) + P(w)\sum_i P(c_i|w)\log\frac{P(c_i|w)}{P(c_i)} + P(\bar{w})\sum_i \frac{P(c_i|\bar{w})}{P(c_i)},$$

wherein $P(c_i) = \frac{df_i}{DF}$, $c_i$ denotes category, i=1, 2, . . . , n, n denotes the number of categories.

The formula includes three portions: the first portion $$-\sum_i P(c_i)\log P(c_i)$$

is a negative value of the entropy of the whole category, corresponding to Entropy(C); the second portion $$P(w)\sum_i P(c_i|w)\log\frac{P(c_i|w)}{P(c_i)}$$

is a product of the entropy including the word w and the probability that the word w appears; the third portion $$P(\bar{w})\sum_i \log\frac{P(c_i|\bar{w})}{P(c_i)}$$

is the product of the entropy without the word w and the probability that the word w does not appear. The second portion and the third portion constitute $$-\sum \frac{|F_i|}{|F|} \text{Entropy}(F_i)$$

together.

The IG method has a following problem: as to a word with a very high frequency and a word with a very low frequency, the distribution of the two attributes {appear in the category, not appear in the category} is unbalanced seriously. The IG values are both close to 0. It is impossible to differentiate the two words simply according to the IG values. Therefore, regarding the above problem, an embodiment of the present invention provides an improved solution based on a principle that attributes should be distributed in balance and importance of the word should be reasonably reflected.

Firstly, all candidate words are classified into different ranges according to DF, wherein manners such as logarithmic gradient, linear gradient, exponential gradient, logarithmic and linear gradient, or exponential and linear gradient may be adopted for classifying the candidate words.

Hereinafter, the logarithmic gradient is taken as an example to describe the classification of the words.

The DF vector of word $w_j$ in category $c_i$ is $df_i$. Calculate $\lfloor\log(df_i)\rfloor$ to obtain a range $[\lfloor\log(df_i)\rfloor, \lfloor\log(df_i)\rfloor+\text{step}]$, map the word $w_j$ to the range, i.e. $w_j \in [\lfloor\log(df_i)\rfloor, \lfloor\log(df_i)\rfloor+\text{step}]$, wherein step denotes gradient, generally is an integer and may be configured according to an accuracy requirement of IG; $\lfloor x \rfloor$ denotes round down of x, i.e. a largest integer not larger than x. Thus, the DF vectors of the words in each range are within certain range.

After the words are classified based on the DF, the IG(w) of the word is calculated based on each range, i.e. when IG(w) is calculated, the calculation is not based on all the categorized data but based on the categorized data corresponding to the range.

Finally, the importance of the word is obtained based on the range and the IG of the word mapped into the range. The IG of the word may be unified into a uniform range, e.g. [low, up]

according to the importance of the word. Thus, the importance of the word may be obtained according to the position of the IG in the range.

It can be seen from the above that, through classifying the words into ranges based on the DF, the distribution of the attributes {appear in the category, not appear in the category} of the word becomes relatively balanced, thus the importance of the word can be determined more accurately.

Mutual Information (MI)

MI is also used for evaluating the relativity between the word and the category, expressed as $$MI(w) = \log\left(\frac{A}{T}\right),$$

wherein A denotes the actual DF value of the word w in a certain category, i.e. $df_i$; T denotes a theoretical DF value of the word w in the category.

Expected Cross Entropy (ECE)

ECE is used for reflect a distance between category distribution probabilities before and after the word w appears, expressed $$ECE(w) = \sum_i P(c_i/w)\log\frac{P(c_i/w)}{P(c_i)}, \text{ wherein } P(c_i) = \frac{df_i}{DF},$$

$c_i$ denotes category, i=1, 2, . . . , n, n denotes the number of categories.

Entropy (ENT)

ENT is used for reflect a distribution uniformity of the word w in all the categories. The smaller the ENT is, the less uniform that the word w distributes in all the categories. Such word is more likely to belong to a specific field and is thus more important. The specific expression of ENT is $$ENT(w) = -\sum_i P(c_i/w)\log P(c_i/w), \text{ wherein } P(c_i) = \frac{df_i}{DF}, i = 1, 2, \ldots, n,$$

i=1, 2, . . . , n, n denotes the number of categories.

All of the MI, ECE and ENT methods have a following problem: they only consider the difference that the word distributes in different categories but do not consider the probability that the word appears. In fact, however, if the DF of the word is low, the word has a low probability to appear and a reliability of the distribution of the word in the categories should be relatively low.

Selective Preference (SELPRE)

The SELPRE is used for evaluating a concentration degree of the meaning of a word, i.e. the capability of the word to be used with other words.

Usually, an important word with concentrated meaning can only be used with some special words, whereas a generalized word can be used with multiple words. Therefore, a distribution of using of words of two parts of speech is calculated firstly. In the embodiment of the present invention, it is possible to configure that nouns may be used with verbs and adjectives, adjectives may be used with nouns, and verbs may be used with nouns. The SELPRE of the word is expressed as $$SELPRE(w) = \sum P(m/w)\log\frac{P(m/w)}{P(m)},$$

wherein P(m/w) denotes a conditional probability that word w can be used with word m, and P(m) denotes the probability that word w and word m used together.

The problem of the SELPRE method is as follows: it does not consider the difference between categories. Therefore, it is impossible to determine whether a word is a special word in certain field according to the SELPRE.

In the above evaluation methods, except for the ENT method, the larger the evaluation value is, the more important the word is. It can be seen from the above that, whichever single method is adopted, it is impossible to obtain an accurate result. Therefore, it is necessary to combine the single-aspect evaluation values effectively. Thus, an importance weight which can accurately reflect the quality of the word can be obtained through an integrated evaluation.

Step 103, a multiple-aspect evaluation of the word is performed based on the multiple single-aspect evaluations to obtain an importance weight of the word.

Specifically, the candidate words are classified into different levels according to their DFs. A multiple-aspect evaluation manner of each candidate word is determined according to the level of the candidate word to obtain an importance weight of the candidate word. The process is described in further detail hereinafter.

Firstly, classify the candidate words into four levels according to the DFs of the candidate words in all the categorized data. The four levels are respectively: super high frequency word, mid high frequency word, mid low frequency word and super low frequency word. The super high frequency word refers to a word with a very high DF which appears in most documents. The super low frequency word refers to a word with a very low DF which only appears in very few documents. The mid high frequency word refers to a word whose DF is between the super high frequency word and the super low frequency word. Although the DF of the mid high frequency word is lower than that of the super high frequency word, it is relatively high and the mid high frequency word appears in many documents. The mid low frequency word refers to a word whose DF is between the super high frequency word and the super low frequency word. Although the DF of the mid low frequency word is relatively low, it is still higher than that of the super low frequency word. The mid low frequency word appears in several documents. The four levels may be identified as: SuperHigh, MidHigh, MidLow and SuperLow. In the embodiment of the present invention, it is not restricted to the above four levels. When the levels are determined according to the DF, different manners such as logarithmic gradient, linear gradient, exponential gradient, logarithmic and linear gradient, and exponential and linear gradient may be adopted. Different levels may have different scopes.

Then, the word is classified into a corresponding level according to the DF in all the categorized data.

Next, a multiple-aspect evaluation manner is obtained based on the single-aspect evaluations obtained in step 102.

The IDF and the AVAIDF methods are both based on the DF. Thus, both the IDF method and the AVAIDF method do not have much contribution to the differentiation of the importance of words in the same level classified according to the DF. But the absolute value of a difference of the IDF and the AVAIDF, i.e. |IDF(w)−AVAIDF(w)| can reflect a distribution difference of the word in different categories, so as to reflect that whether the word is important. Therefore, a formula Diff(w)=|AVAIDF(w)−IDF(w)| is obtained. This integrated evaluation manner effectively overcomes the defect that the single-evaluation manner cannot accurately determine the importance of the word in the SuperHigh level and the SuperLow level. For example, with respect to a word "lighten", Diff(lighten)=|5.54−2.89|=2.65, whereas with respect to word "ha ha", Diff(haha)=|5.16−4.76|=0.4. This is because the word "lighten" appears a lot in some categories but rarely appears in others. However, the word "ha ha" appears a lot in each category. An important word may be determined accurately by Diff(w). The larger the value of Diff(w) is, the more important the word is.

The MI, ECE and ENT methods are all based on the distribution probability of the word in each category. Therefore, these three methods may be used together to evaluate the importance of the word. Specifically, MI(w), ECE(w) and ENT(w) are linearly normalized. And since the ENT is in a reverse relationship with the importance of the word, a descending normalization is required. Then, $LineNorm_1(MI(w))$, $LineNorm_2(ECE(w))$ and $LineNormDesc(ENT(w))$ are obtained. A linear combination of the above three is taken as an evaluation basis, expressed as $$ProbBased(w) = \frac{LineNorm_1(MI(w)) + LineNorm_2(ECE(w)) + LineNormDesc(ENT(w))}{3}.$$

The IG and chi-square methods are related to both the DF and the distribution probability of the word in each category. Therefore, these two methods may be combined to determine the importance of a word. Specifically, $\chi^2(w)$ and IG(w) are logarithmic normalized to obtain $LogNorm(\chi^2(w))$ and $LogNorm(IG(w))$, and then they are combined to obtain $$ProbDFRel(w) = \frac{LogNorm_1(\chi^2 * w)) + LogNorm_2(IG(w))}{2}.$$

The SELPRE method is based on the relationship of words. It is used as an independent evaluation manner. It is expressed as $SelPre(w)=LineNorm_3(SELPRE(w))$ after linear normalization.

Figure 2:
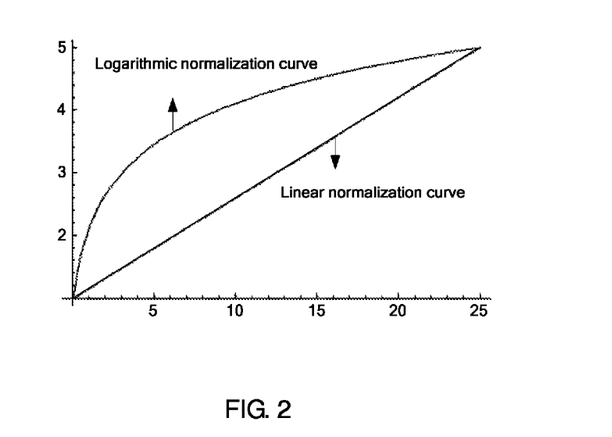
FIG. 2 is a schematic diagram illustrating a comparison of a linear normalization curve and a logarithmic normalization curve according to an embodiment of the present invention.

Some of the above manners are based on the DF, whereas some of them are based on the distribution probability of the word. Therefore, the evaluation values have different ranges. Accordingly, the evaluation values should be normalized into one range. In an embodiment of the present invention, the linear normalization method and the logarithmic normalization method are adopted. A comparison of the two methods is shown in FIG. 2. As shown in FIG. 2, in their original ranges, the two methods have different changing trends. If variable x is a function of a logarithm of probability or a function of a logarithm of DF, the linear normalization method is generally adopted; otherwise, the logarithmic normalization method is adopted. In addition, the normalization method may be selected according to experience on data analysis.

The linear normalization is to map one range to another range through a linear method. The formula is expressed by LineNorm(x)=kx+b, wherein k>0, x is MI(w), ECE(w) and SELPRE(w). The logarithmic normalization method is to map one range to another through a logarithmic method. The formula is expressed as LogNorm(x)=log(kx+b), wherein k>0, x is $\chi^2(w)$ and IG(w). The above two are ascending methods, i.e. k>0. If k<0, it is a descending method. The formula adopted is LineNormDesc(x)=kx+b or LogNormDesc(x)=log(kx+b), wherein x is ENT(w). The values of k and b may be calculated according to ends of the range after mapping.

After the integrated evaluation manners are obtained, the multiple-aspect evaluation manner of the word may be determined according to the level of the word. Herein, corresponding multiple-aspect evaluation manners are respectively configured for the four levels.

As to words in the SuperHigh level and the MidHigh level, all of the above integrated evaluations are reliable. Therefore, the multiple-evaluation may adopt a link manner, expressed as SuperHigh(w)=MidHigh(w)=Diff(w)*ProbBased(w) *ProbDFRel(w)*SelPre(w)

As to words in the MidLow level, the DF is not high and there are few words can be used together, the integrated evaluation mannerSelPre(w) is less reliable. Therefore, the multiple-aspect evaluation manner of words in the MidLow level is expressed as MidLow(w)=Diff(w)*ProbBased(w) *ProbDFRel(w)+SelPre(w).

As to words in the SuperLow level, the IG method and the chi-square method are both less reliable and there are very few words can be used together. Therefore, the SELPRE method is not considered. Accordingly, the multiple-aspect evaluation manner of words in the SuperLow level is express as SuperLow(w)=Diff(w)*(ProbBased(w)+ProbDFRel(w)).

After the multiple-aspect evaluation manner of the word is determined according to the level of the word, the defects of the single-aspect evaluations mentioned above in step 102 are overcome. Hereinafter, the multiple-aspect evaluation of words in high frequency level (including the SuperHigh level and the MidHigh level) and the SuperLow level are described, wherein differentiations in these levels are most difficult.

In the high frequency level, two words "lighten" and "ha ha" are considered. Although the IDFs of the two words are close, the word "lighten" appears most in "QQ game" category, whereas "ha ha" appears evenly in all categories. Thus, the two words may be differentiated through Diff(w). In addition, $\chi^2$ of "lighten" is 1201744, and $\chi^2$ of "ha ha" is 3412. After $\chi^2(w)$ is normalized, the difference between them is even larger. It is basically the same situation with respect to the IG. Thus, the importance of the two words may also be clearly differentiated through ProbDFRel(w). At the same time, ProbBased(w) is mainly used for determine the distribution uniformity of the word in all categories. It can also differentiate the two words. As to SelPre(w), "ha ha" is a much generalized word and may be used together with many words. However, "lighten" is usually used on icons and context related to a QQ product. Thus, the multiple-aspect evaluation of "lighten" is 9.65, whereas the multiple-aspect evaluation of "ha ha" is 1.27. Therefore, it can be determined that "lighten" is a high quality word, and "ha ha" is a low quality word.

In the SuperLow level, a word "Chujiangzhen" (a town in Hunan province) and a randomly input word "fdgfdg" are considered. Both of them have a very low DF, and their IDFs are both around 14. But the word "Chujiangzhen" mostly appears in "region" category, whereas "fdgfdg" may appear in all categories. Thus, Diff(Chujiangzhen)=2.12 and Diff (fdgfdg)=1.05. Although the $\chi^2$ of "Chujiangzhen" and the $\chi^2$ of "fdgfdg" are both small, they can be differentiated by taking Diff(w) into consideration. At the same time, the Prob-Based(w) of "Chujiangzhen" is obviously larger than the ProbBased(w) of "fdgfdg". Finally, it is obtained that the multiple-aspect evaluation of "Chujiangzhen" is 9.71, and the multiple-aspect evaluation of "fdgfdg" is 1.13. Thus, it can be determined that "Chujiangzhen" is a high quality word and "fdgfdg" is a low quality word.

In view of the above, the method of combining the multiple-aspect evaluation and the level classification based on DF makes it possible to determine the importance of a word according to the integrated evaluation manner of the corresponding level. The above SuperHigh(w), MidHigh(w), MidLow(w) and SuperLow(w) obtained in each level are the importance weight of the word in the corresponding level, and may be expressed as WgtPart(w) in general.

Step 104, determine the quality of the word according to the importance weight of the word.

After the importance weight of the word is obtained, the quality of the word may be determined according to the importance weight of the word, so as to obtain high quality words for subsequent use in document processing.

One processing method is as follows:

Firstly, respectively configure an important threshold a and a constantly-used threshold β for each level. These two thresholds may be configured according to a mining and evaluating requirement. If a lot of important words are required, α may be configured lower; otherwise, α may be configured higher. If it is required to classify a lot of words to a constantly-used range, β may be configured higher; otherwise, β may be configured lower. If there are four levels configured in step 103, a pair of α and β should be configured for each level. As a result, there are four pairs of α and β altogether.

Then, determine the quality of the word in each level according to a relationship between the above two thresholds of the level and the importance weight of the word in the level. The quality of the word in each level may be expressed as $$QualPart(w) = \begin{cases} \text{important,} & WgtPart(w) \geq \alpha \\ \text{common,} & \beta \leq WgtPart(w) < \alpha \\ \text{constantly-used,} & WgtPart(w) < \beta. \end{cases}$$

After the above processing, what is obtained is merely the quality of the word in the level. However, when a document is analyzed by selecting an important word and a common word, a uniform evaluation standard is usually required to differentiate functions of different words.

After the candidate words are classified into levels according to the DF, the words in each level are effectively classified according to their importance. But extreme values of WgtPart(w) in different levels are different. Therefore, a normalization processing is required, i.e. normalize WgtPart(w) of each level to obtain an integrated importance weight Wgt(w) of the word. For example, an integrated importance weight Wgt(w) =LineNorm(WgtPart(w)) may be obtained through a linear normalization. In addition, the logarithmic normalization may also be adopted to obtain the integrated importance weight of the word.

Finally, based on the Wgt(w) obtained by the normalization processing, with respect to words of the same quality in different levels, an integrated quality classification is performed. For example, in step 103, four levels are obtained. Then, with respect to the words in the four levels whose quality are important, perform an integrated quality classification. A very important threshold $\epsilon_1$ and a common important threshold $\epsilon_2$ are configured for the levels after the normalization processing. All words are classified by quality, $$Qual_{important}(w) = \begin{cases} \text{very important,} & Wgt(w) \geq \varepsilon_1 \\ \text{important,} & \varepsilon_2 \leq Wgt(w) < \varepsilon_1 \\ \text{less important,} & Wgt(w) < \varepsilon_2. \end{cases}$$

$$Qual_{common}(w) = \begin{cases} \text{common,} & Wgt(w) \geq \eta_1 \\ \text{very common,} & \eta_2 \leq Wgt(w) < \eta_1 \\ \text{extremely common,} & Wgt(w) < \eta_2, \end{cases}$$

$$Qual_{constantly-used}(w) = \begin{cases} \text{constantly-used,} & Wgt(w) \geq \lambda_1 \\ \text{very constantly-used,} & \lambda_2 \leq Wgt(w) < \lambda_1 \\ \text{extremely constantly-used,} & Wgt(w) < \lambda_2. \end{cases}$$

Another processing method is as follows.

Since the extreme values of WgtPart(w) in different levels are different, the WgtPart(w) of words in different levels are not comparable. Therefore, another normalization processing is required, i.e. WgtPart(w) of each level needs to be normalized to obtain an integrated importance weight of the word. For example, an integrated importance weight Wgt(w) =LineNorm(WgtPart(w)) of the word may be obtained through a linear normalization. In addition, logarithmic normalization may also be adopted to obtain the integrated importance weight of the word.

Then, configure an important threshold α' and a constantly-used threshold β' after the normalization processing. According to a relationship between the above two thresholds and the integrated importance weight of the word, the word is classified, expressed $$\text{as } Qual(w) = \begin{cases} \text{important,} & Wgt(w) \geq \alpha' \\ \text{common,} & \beta' \leq Wgt(w) < \alpha' \\ \text{constantly-used,} & Wgt(w) < \beta'. \end{cases}$$

The above steps may be executed on any apparatus for realizing word quality mining and evaluating, e.g. computer, web server, which is not restricted in the embodiments of the present invention.

Figure 3:
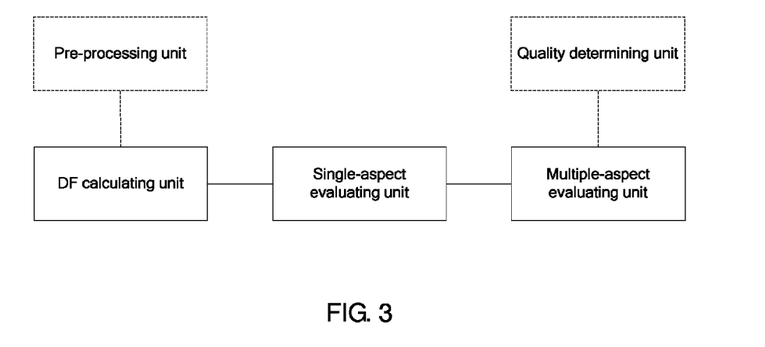
FIG. 3 is a schematic diagram illustrating a structure of an apparatus for implementing word quality mining and evaluating according to an embodiment of the present invention.

FIG. 3 is a schematic diagram illustrating a structure of an apparatus for word quality mining and evaluating according to an embodiment of the present invention. As shown in FIG. 3, the apparatus includes: a DF calculating unit, a single-aspect evaluating unit and a multiple-aspect evaluating unit, wherein the DF calculating unit is adapted to calculate a DF of the word in mass categorized data; the single-aspect evaluation unit is adapted to evaluate the word in a single aspect according to the DF of the word; the multiple-aspect evaluating unit is adapted to evaluate the word in multiple aspects according to multiple single-aspect evaluations of the word to obtain an importance weight of the word.

The apparatus may further include a pre-processing unit, adapted to pre-process words of the mass categorized data, e.g. unify of traditional characters and simplified characters, unify of capital characters and lower case characters, unify full-width and half-width characters, so as to standardize the words and make the words uniform.

The apparatus may further include a quality determining unit, adapted to determine the quality of the word according to the importance weight of the word.

The DF calculating unit includes: a DF vector calculating module and a DF calculating module, wherein the DF vector calculating module is adapted to calculate a DF vector of the word in each category of the mass categorized data; the DF calculating module is adapted to take a sum of the DF vectors of the word as the DF of the word in all the categorized data.

The single-aspect evaluating unit includes multiple modules each of them is used for implementing a single-aspect evaluation. The single-aspect evaluating unit may include: an IDF module, an AVAIDF module, a chi-square module, an IG module, an MI module, an ECE module, an ENT module and a SELPRE module. Specifically, the IG module may include a range dividing module and an IG calculating module. The range dividing module is adapted to classify all candidate words into different ranges according to their DFs. The IG calculating module is adapted to calculate the IG of the word based on the categorized data corresponding to range of the word. When the range dividing module classifies the candidate words, methods such as logarithmic gradient, linear gradient, exponential gradient, logarithmic and linear gradient, or exponential and linear gradient may be adopted.

The multiple-aspect evaluating unit includes: a level dividing module and a multiple-aspect evaluation manner determining module. The level dividing module is adapted to classify the candidate words into different levels according to the DFs of the words. The multiple-aspect evaluation manner determining unit is adapted to determine the multiple-aspect evaluation manner of the word according to the level of the word to obtain the importance weight of the word in the corresponding level. The level dividing module may include: a level range dividing module and a word classifying module. The range dividing module is adapted to configure ranges according to the DFs of the words in all the categorized data. The word classifying module is adapted to classify the word into a corresponding level according to the DF of the word in all the categorized data.

Figure 4A:
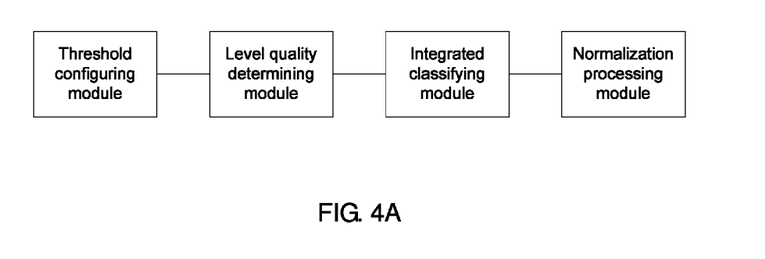
FIG. 4A is a schematic diagram illustrating a first structure of a quality determining unit according to an embodiment of the present invention.

The quality determining unit may include: a threshold configuring module, a level quality determining module, a normalization processing module and an integrated classifying module, as shown in FIG. 4A. The threshold configuring module is adapted to configure an importance threshold and a constantly-used threshold for each level, wherein the level are configured according to the DFs of the words in all the categorized data. The level quality determining module is adapted to determine the quality of the word in the level according to a relationship between the two thresholds and the importance weight of the word in the level. The normalization processing module is adapted to normalize the importance weight of the word in each level to obtain an integrated importance weight of the word. The integrated classifying module is adapted to classify words of the same quality in different levels according to the integrated importance weights of the words.

Figure 4B:
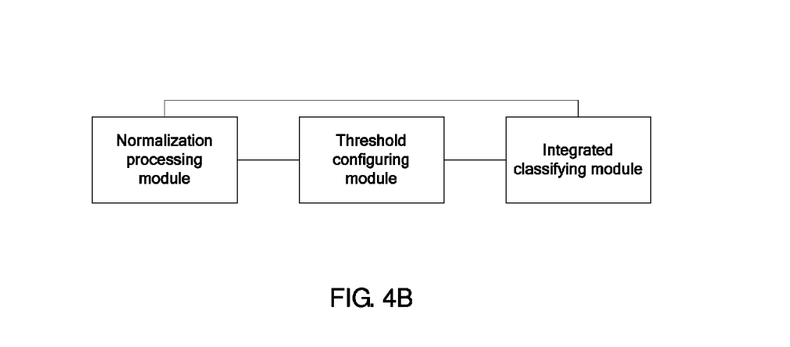
FIG. 4B is a schematic diagram illustrating a second structure of a quality determining unit according to an embodiment of the present invention.

Alternatively, the quality determining unit may also include: a normalization processing module, a threshold configuring module and an integrated classifying module, as shown in FIG. 4B. The normalization processing module is adapted to normalize the importance weight of the word in each level to obtain an integrated importance weight of the word, wherein the level is configured according to the DFs of the words in all the categorized data. The threshold configuring module is adapted to configure an importance threshold and a constantly-used threshold for each level. The integrated classifying module is adapted to classify the word according to a relationship between the two thresholds and the integrated importance weight of the word.

What has been described and illustrated herein is a preferred example of the disclosure along with some of its variations. The words, descriptions and figures used herein are set forth by way of illustration only and are not meant as limitations. Many variations are possible within the spirit and scope of the disclosure, which is intended to be defined by the following claims—and their equivalents—in which all words are meant in their broadest reasonable sense unless otherwise indicated.

What is claimed is:

1. A word mining and evaluating method, the method comprising:
   calculating a Document Frequency (DF) of a word in mass categorized data;
   evaluating the word in multiple single-aspects according to the DF of the word; and
   evaluating the word in a multiple-aspect according to the evaluations in the multiple single-aspects to obtain an importance weight of the word;
   wherein the evaluating the word in a multiple-aspect according to the evaluations in the multiple single-aspects to obtain the importance weight of the word comprises,
   classifying candidate words into levels according to DFs of the candidate words, wherein the levels comprises a SuperHigh level, a MidHigh level, a MidLow level and a SuperLow level; and
   for each candidate word in the SuperHigh level, the MidHigh level or the MidLow level, determining the importance weight of the candidate word according to,
      an absolute value of a difference between an average inverse document frequency (AVAIDF) and an inverse document frequency (IDF) of the candidate word,
      a linear combination of mutual information (MI), expect cross entropy (ECE) and entropy (ENT) of the candidate word,
      a combination of logarithmic normalized chi-square and information gain (IG) of the candidate word, and
      logarithmic normalized selective preference (SELPRE) of the candidate word; and
   for each candidate word in the SuperLow level, determining the importance weight of the candidate word according to,
      an absolute value of a difference between an average inverse document frequency (AVAIDF) and an inverse document frequency (IDF) of the candidate word,
      a linear combination of mutual information (MI), expect cross entropy (ECE) and entropy (ENT) of the candidate word, and
      a combination of logarithmic normalized chi-square and information gain (IG) of the candidate word.

2. The method of claim 1, wherein the calculating the DF of the word in the mass categorized data comprises:
   calculating a DF vector of the word in each category of the mass categorized data; and
   taking a sum of DF vectors of the word in all categories as the DF of the word in all the categories.

3. The method of claim 1, wherein the single-aspect evaluation comprises one or more of: Inverse Document Frequency (IDF), Average IDF (AVAIDF), chi-square, Information Gain (IG), Mutual Information (MI), Expect Cross Entropy (ECE), Entropy (ENT) and selective preference (SELPRE).

4. The method of claim 3, wherein the single-aspect evaluation is the IG, the evaluating the word comprises:

classifying all candidate words into ranges according to DFs of the candidate words; and calculating the IG of the word based on the categorized data corresponding to a range of the word.

5. The method of claim 1, wherein the classifying the candidate words into levels according to the DFs comprises:

determining the levels according to the DF of each word in all the categorized data; and classifying each word into a corresponding level according to the DF of the word in all the categorized data.

6. The method of claim 1, further comprising:

before calculating the DF of the word in the mass categorized data, processing the word in the mass categorized data in advance; and/or, after obtaining the importance weight of the word, determining a quality of the word according to the importance weight of the word.

7. The method of claim 6, wherein the determining the quality of the word according to the importance weight of the word comprises:

configuring an importance threshold and a constantly-used threshold for each level, wherein the levels are obtained according to the DFs of the words in all the categorized data; determining a quality of the word in the corresponding level according to a relationship between the two thresholds and the importance weight of the word in the level; normalizing the importance weight of the word in each level to obtain a integrated importance weight of the word; based on the integrated importance weight of the word, performing an integrated quality classification to words of the same quality in different levels;

or, normalizing the importance weight of the word in each level to obtain an integrated importance weight of the word, wherein the level is obtained according to the DFs of the words in all the categorized data; configuring an important threshold and a constantly-use threshold; performing an integrated quality classification to the word according to a relationship between the two thresholds and the integrated importance weight.

8. The method of claim 1, wherein the importance weight of the candidate word in the SuperHigh level or the MidHigh level is determined according to a following formula:

$$\text{SuperHigh}(w) = \text{MidHigh}(w) = \text{Diff}(w) * \text{ProbBased}(w) * \text{ProbDFRel}(w) * \text{SelPre}(w);$$

the importance weight of the candidate word in the MidLow level is determined according to a following formula:

$$\text{MidLow}(w) = \text{Diff}(w) * \text{ProbBased}(w) * \text{ProbDFRel}(w) + \text{SelPre}(w);$$

wherein,

SuperHigh(w) denotes the importance weight of the candidate word in the SuperHigh level, MidHigh(w) denotes the importance weight of the candidate word in the MidHigh level, MidLow(w) denotes the importance weight of the candidate word in the MidLow level, Diff (w) denotes the absolute value of the difference between the average inverse document frequency and the inverse document frequency of the candidate word, ProbBased(w) denotes the linear combination of the mutual information, the expect cross entropy and the entropy of the candidate word, ProbDFRel(w) denotes the combination of the logarithmic normalized chi-square and the information gain of the candidate word, and SelPre(w) denotes the logarithmic normalized selective preference of the candidate word.

9. The method of claim 1, wherein the importance weight of the candidate word in the SuperLow level is determined according to a following formula:

$$\text{SuperLow}(w) = \text{Diff}(w) * (\text{ProbBased}(w) + \text{ProbDFRel}(w));$$

wherein,

SuperLow(w) denotes the importance weight of the candidate word in the SuperLow level, Diff (w) denotes the absolute value of the difference between the average inverse document frequency and the inverse document frequency of the candidate word, ProbBased(w) denotes the linear combination of the mutual information, the expect cross entropy and the entropy of the candidate word, and ProbDFRel(w) denotes the combination of the logarithmic normalized chi-square and the information gain of the candidate word.

10. An apparatus for word mining and evaluating, comprising:

one or more processors;

a memory; and one or more program units stored in the memory and to be executed by the one or more processors, the one or more program units comprising;

a DF calculating unit, configured to calculate a DF of a word in mass categorized data;

a single-aspect evaluating unit, configured to evaluate the word in multiple single-aspects according to the DF of the word;

a multiple-aspect evaluating unit, configured to evaluate the word in a multiple-aspect according to the multiple single-aspect evaluations to obtain an importance weight of the word, wherein the multiple-aspect evaluating unit comprises:

a level dividing module, configured to configure levels according to DFs of candidate words, wherein the levels comprises a SuperHigh level, a MidHigh level, a MidLow level and a SuperLow level; and a multiple-aspect evaluating module, configured to evaluate the word in the multiple-aspect according to the level of the word to obtain an importance weight of the word in the level, to determine, for each candidate word in the SuperHigh level, the MidHigh level or the MidLow level, the importance weight of the candidate word according to:

an absolute value of a difference between an average inverse document frequency (AVAIDF) and an inverse document frequency (IDF) of the candidate word, a linear combination of mutual information (MI), expect cross entropy (ECE) and entropy (ENT) of the candidate word, a combination of logarithmic normalized chi-square and information gain (IG) of the candidate word, and logarithmic normalized selective preference (SELPRE) of the candidate word;

determine, for each candidate word in the SuperLow level, the importance weight of the candidate word according to, an absolute value of a difference between an average inverse document frequency (AVAIDF) and an inverse document frequency (IDF) of the candidate word, a linear combination of mutual information (MI), expect cross entropy (ECE) and entropy (ENT) of the candidate word, and a combination of logarithmic normalized chi-square and information gain (iq) of the candidate word.

11. The apparatus of claim 10, wherein the DF calculating unit comprises:
a DF vector calculating module, configured to calculate a DF vector of the word in each category of the categorized data; and
a DF calculating module, configured to take a sum of DF vectors of the word as the DF of the word in all the categories.

12. The apparatus of claim 10, wherein the single-aspect evaluating unit comprises: an Inverse Document Frequency (IDF) module, an Average IDF (AVAIDF) module, a chi-square module, an Information Gain (IG) module, a Mutual Information (MI) module, an Expected Cross Entropy (ECE) module, an Entropy (ENT) module and a Selective Preference (SELPRE) module.

13. The apparatus of claim 12, wherein the IG module comprises:
a range dividing module, configured to configure ranges according to DFs of all candidate words; and
an IG calculating module, configured to calculate an IG of the word according to the categorized data corresponding to the range of the word.

14. The apparatus of claim 10, wherein the level dividing module comprises:
a level rang dividing module, configured to configure levels according to the DFs of the words in all the categorized data; and
a word classifying module, configured to classify the word to a corresponding level according to the DF of the word in all the categorized data.

15. The apparatus of claim 10, further comprising:
a pre-processing unit, configured to process the word in the mass categorized data in advance; and/or
a quality determining unit, configured to determine the quality of the word according to the importance weight of the word.

16. The apparatus of claim 15,
wherein the quality determining unit comprises:
a threshold configuring module, configured to configure an importance threshold and a constantly-used threshold for each level, wherein the level is obtained according to the DFs of the words in all the categorized data;
a level quality determining module, configured to determine the quality of the word in the level according to a relationship between the two thresholds and the importance weight of the word in the corresponding level;
a normalization processing module, configured to normalize the importance weight of the word in each level to obtain an integrated importance weight of the word;
an integrated classifying module, configured to perform an integrated quality classification to words of the same quality in different levels based on the integrated importance weight of the word;
or,
the quality determining unit comprises:
a normalization module, configured to normalize the importance weight of the word in each level to obtain an integrated importance weight of the word, wherein the levels are divided according to the DFs of the words in all the categorized data;
a threshold configuring module, configured to configure an important threshold and a constantly-used threshold; and
an integrated classifying module, configured to perform an integrated quality classification to all words based on a relationship between the two thresholds and the integrated importance weight of the word.

17. The apparatus of claim 10, wherein the multi-aspect evaluating module is further configured to:
determine the importance weight of the candidate word in the SuperHigh level or the MidHigh level according to a following formula:

$$\text{SuperHigh}(w) = \text{MidHigh}(w) = \text{Diff}(w) * \text{ProbBased}(w) * \text{Prob}DF\text{Rel}(w) * \text{SelPre}(w);$$

determine the importance weight of the candidate word in the MidLow level according to a following formula:

$$\text{MidLow}(w) = \text{Diff}(w) * \text{ProbBased}(w) * \text{Prob}DF\text{Rel}(w) + \text{SelPre}(w);$$

wherein,
SuperHigh(w) denotes the importance weight of the candidate word in the SuperHigh level,
MidHigh(w) denotes the importance weight of the candidate word in the MidHigh level,
MidLow(w) denotes the importance weight of the candidate word in the MidLow level,
Diff (w) denotes the absolute value of the difference between the average inverse document frequency and the inverse document frequency of the candidate word,
ProbBased(w) denotes the linear combination of the mutual information, the expect cross entropy and the entropy of the candidate word,
ProbDFRel(w) denotes the combination of the logarithmic normalized chi-square and the information gain of the candidate word, and
SelPre(w) denotes the logarithmic normalized selective preference of the candidate word.

18. The apparatus of claim 10, wherein the multi-aspect evaluating module is further configured to:
determine the importance weight of the candidate word in the SuperLow level according to a following formula:

$$\text{SuperLow}(w) = \text{Diff}(w) * (\text{ProbBased}(w) + \text{Prob}DF\text{Rel}(w));$$

wherein,
SuperLow(w) denotes the importance weight of the candidate word in the SuperLow level,
Diff (w) denotes the absolute value of the difference between the average inverse document frequency and the inverse document frequency of the candidate word,
ProbBased(w) denotes the linear combination of the mutual information, the expect cross entropy and the entropy of the candidate word, and
ProbDFRel(w) denotes the combination of the logarithmic normalized chi-square and the information gain of the candidate word.

* * * * *

UNITED STATES PATENT AND TRADEMARK OFFICE
CERTIFICATE OF CORRECTION

PATENT NO.        : 8,645,418 B2                                  Page 1 of 1
APPLICATION NO.   : 13/465465
DATED             : February 4, 2014
INVENTOR(S)       : Liu et al.

It is certified that error appears in the above-identified patent and that said Letters Patent is hereby corrected as shown below:

On the title page:

Item [63], line 2, "July 28, 2010" should be --June 28, 2010--

Signed and Sealed this
Sixteenth Day of September, 2014

Michelle K. Lee
*Deputy Director of the United States Patent and Trademark Office*